United States Patent
Marques et al.

(10) Patent No.: US 12,271,702 B2
(45) Date of Patent: *Apr. 8, 2025

(54) SEMANTIC-AWARE FEATURE ENGINEERING

(71) Applicant: Feedzai—Consultadoria e Inovação Tecnológica, S.A., Coimbra (PT)

(72) Inventors: Paulo César Gonçalves Marques, Braga (PT); Miguel Ramos de Araújo, Oporto (PT); Bruno Casal Laraña, Oporto (PT); Nuno Miguel Lourenço Diegues, Lisbon (PT); Pedro Cardoso Lessa e Silva, Oporto (PT); Pedro Gustavo Santos Rodrigues Bizarro, Lisbon (PT)

(73) Assignee: Feedzai—Consultadoria e Inovação Tecnológica, S.A. (PT)

( * ) Notice: Subject to any disclaimer, the term of this patent is extended or adjusted under 35 U.S.C. 154(b) by 0 days.

This patent is subject to a terminal disclaimer.

(21) Appl. No.: 18/647,596

(22) Filed: Apr. 26, 2024

(65) Prior Publication Data

US 2024/0411995 A1    Dec. 12, 2024

Related U.S. Application Data

(63) Continuation of application No. 16/567,761, filed on Sep. 11, 2019, now Pat. No. 12,001,800.

(60) Provisional application No. 62/730,985, filed on Sep. 13, 2018.

(51) Int. Cl.
| | | |
|---|---|---|
| *G06Q 20/40* | (2012.01) | |
| *G06F 17/18* | (2006.01) | |
| *G06F 18/214* | (2023.01) | |
| *G06F 40/30* | (2020.01) | |
| *G06N 20/00* | (2019.01) | |
| *H04L 9/40* | (2022.01) | |

(52) U.S. Cl.
CPC .............. *G06F 40/30* (2020.01); *G06F 17/18* (2013.01); *G06F 18/2155* (2023.01); *G06N 20/00* (2019.01); *G06Q 20/4016* (2013.01)

(58) Field of Classification Search
None
See application file for complete search history.

(56) References Cited

U.S. PATENT DOCUMENTS

| | | |
|---|---|---|
| 2009/0171662 A1 | 7/2009 | Huang |
| 2011/0225076 A1 | 9/2011 | Wang |
| 2015/0317389 A1* | 11/2015 | Hua ............... G06F 16/334 |
| | | 707/738 |

(Continued)

OTHER PUBLICATIONS

Multi-Class Part Parsing With Joint Boundary-Semantic Awareness (Year: 2019).*

(Continued)

*Primary Examiner* — Bruce I Ebersman
*Assistant Examiner* — Bhavin D Shah
(74) *Attorney, Agent, or Firm* — Van Pelt, Yi & James LLP

(57) ABSTRACT

In an embodiment, a process for semantic-aware feature engineering includes receiving semantic labels for data fields of training data. Each of the semantic labels is associated with a semantic meaning associated with a corresponding data field. The process includes automatically generating at least one new feature using at least a portion of the semantic labels.

20 Claims, 10 Drawing Sheets

(56) References Cited

U.S. PATENT DOCUMENTS

| | | | |
|---|---|---|---|
| 2016/0151918 A1 | 6/2016 | Stoyanchev | |
| 2016/0283975 A1 | 9/2016 | Kaul | |
| 2016/0357851 A1 | 12/2016 | Perkins | |
| 2017/0024431 A1 | 1/2017 | Dayan | |
| 2019/0088135 A1* | 3/2019 | Do | B60W 50/14 |

OTHER PUBLICATIONS

Semantic information extraction for software requirements using semantic role labeling (Year: 2015).*

Alejandro Correa Bahnsen, Djamila Aouada, Aleksandar Stojanovic, Björn Ottersten, "Feature engineering strategies for credit card fraud detection", Expert Systems with Applications, vol. 51, 2016, pp. 134-142, ISSN 0957-4174, https://doi.org/10.1016/j.eswa.2015.12.030.

Author Unknown, Feature Engineering, Wikipedia, Published May 28, 2019, Retrieved Aug. 1, 2019, https://en.wikipedia.org/wiki/Feature_engineering.

Feurer et al., Efficient and Robust Automated Machine Learning, Advances in Neural Information Processing Systems, 2015.

Kanter et al., Deep Feature Synthesis: Towards Automating Data Science Endeavors, 2015 IEEE International Conference on Data Science and Advanced Analytics (DSAA), 2015, pp. 1-10.

Katz et al., Explorekit: Automatic Feature Generation and Selection, 2016 IEEE 16th International Conference on Data Mining (ICDM), 2016, pp. 979-984.

Khurana et al., Cognito: Automated Feature Engineering for Supervised Learning, 2016 IEEE 16th International Conference on Data Mining Workshops (ICDMW), 2016, pp. 1304-1307.

Khurana et al., Feature Engineering for Predictive Modeling Using Reinforcement Learning, Thirty-Second AAAI Conference on Artificial Intelligence, 2018.

Lam et al., One Button Machine for Automating Feature Engineering in Relational Databases, arXiv, 2017.

Li et al., Cloud AutoML: Making AI Accessible to Every Business, Jan. 17, 2018, https://www.blog.google/products/google-cloud/cloud-automl-making-ai-accessible-every-business/.

Nargesian et al., Learning Features Engineering for Classification, Proceedings of the Twenty-Sixth International Joint Conference on Artificial Intelligence (IJCAI-17), 2017, pp. 2529-2535.

Olson et al., TPOT: A Tree-based Pipeline Optimization Tool for Automating Machine Learning, Workshop on Automatic Machine Learning, 2016, pp. 66-74.

Pedro Domingos, A Few Useful Things to Know about Machine Learning, Communications of the ACM, Oct. 2012, vol. 55, Issue 10.

Thornton et al., Auto-WEKA: Combine Selection and Hyperparameter Optimization of Classification Algorithms, Proceedings of the 19th ACM SIGKDD International Conference on Knowledge Discovery and Data Mining, 2013, pp. 847-855.

U. Khurana, D. Turaga, H. Samulowitz and S. Parthasrathy, "Cognito: Automated Feature Engineering for Supervised Learning," 2016 IEEE 16th International Conference on Data Mining Workshops (ICDMW), Barcelona, Spain, 2016, pp. 1304-1307, doi: 10.1109/ICDMW.2016.0190.

* cited by examiner

SEMANTIC-AWARE FEATURE ENGINEERING

CROSS REFERENCE TO OTHER APPLICATIONS

This application is a continuation of U.S. patent application Ser. No. 16/567,761, now U.S. Pat. No. 12,001,800, entitled SEMANTIC-AWARE FEATURE ENGINEERING filed Sep. 11, 2019, which is incorporated herein by reference for all purposes, which claims priority to U.S. Provisional Patent Application No. 62/730,985 entitled SEMANTIC AUTO MACHINE LEARNING filed Sep. 13, 2018, which is incorporated herein by reference for all purposes.

BACKGROUND OF THE INVENTION

Feature engineering, which is the determination of features during the training phase, is an important but complex and time-consuming task. Conventionally, data scientists formulate policies or rules using features. Another way data scientists typically use features that they have manually selected is inputting them into a machine learning model to train the model to make predictions. The features input to a machine learning model affect how well the final trained model will perform. Upon completion of the training phase, a trained machine learning model takes input data and outputs a result such as a prediction or classification. Recently, there have been efforts to automate feature engineering. However, conventional approaches are resource-intensive and typically result in unintelligible and not useful features.

BRIEF DESCRIPTION OF THE DRAWINGS

Various embodiments of the invention are disclosed in the following detailed description and the accompanying drawings.

DETAILED DESCRIPTION

Figure 1:
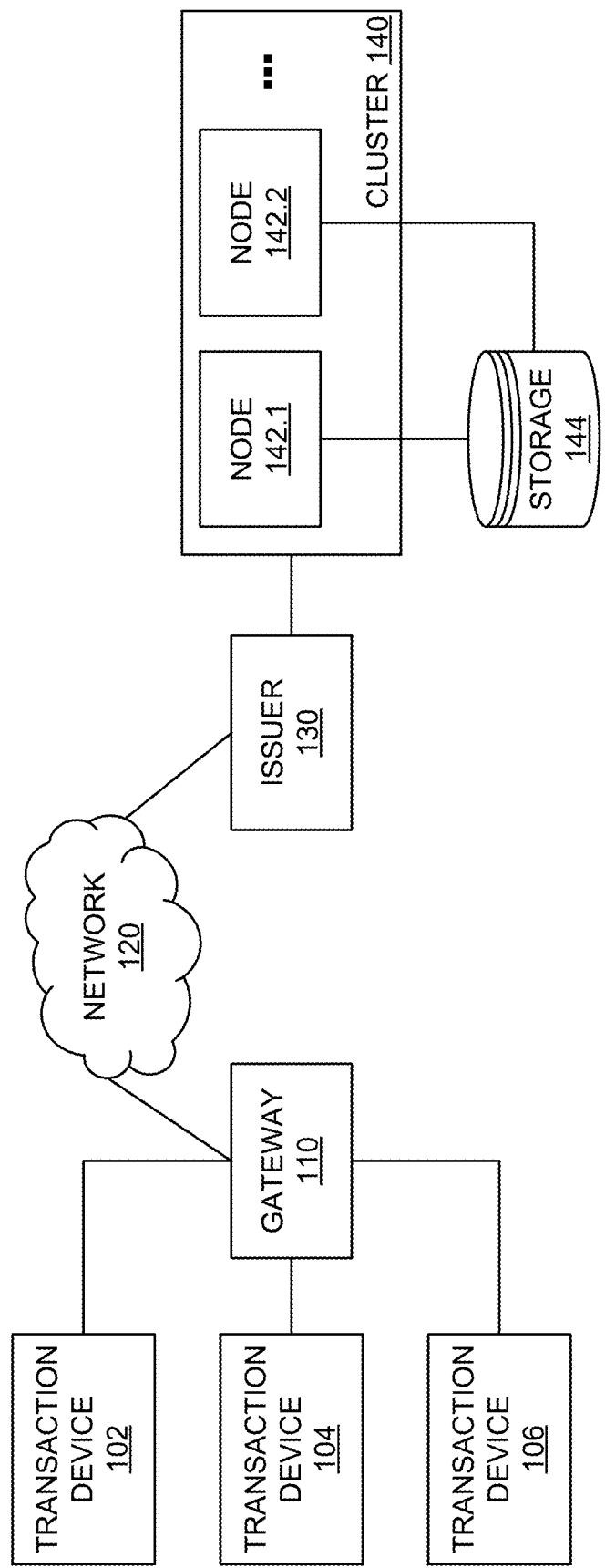
FIG. 1 is a block diagram illustrating an embodiment of a system in which semantic-aware feature engineering can be implemented.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications, and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Semantic-aware feature engineering is disclosed. Features are programmatically generated by a computer processor by taking input data fields that have associated semantic labels, and applying suitable transformations to the input data fields to generate new features. The new features can provide insight about data, can be used to train a machine learning model, and can be used to form policies about how to handle data, among other things.

Conventional feature engineering methods tend to use a lot of memory and computing time to generate numerous unintelligible or not meaningful features. An unintelligible feature could result in a spurious correlation with the target variable and increase the chances of overfitting. Too many features (such as in the case of fraud prevention where on the order of millions to billions of instances are common) require large amounts of computing resources to generate features. This can make the user experience slow and unpleasant.

The techniques disclosed herein extend data types with semantic meaning and embeds domain knowledge into data transformations to generate new features that can be used to form policies for handling data or to improve the performance (e.g., predictive and analytical ability) of machine learning models (sometimes simply called "models"). In various embodiments, new features are programmatically generated by attributing semantic meaning to an original set of features or data fields, and applying transformations that leverage the semantic meaning to determine the new features. In one aspect, the new features are understandable and relevant and therefore better than features determined by conventional techniques. In another aspect, the set of new features can be smaller and more relevant than the set of features generated by conventional techniques. The disclosed techniques reduce the search space for relevant features to a set of meaningful features, which in turn reduces the amount of resources needed to perform feature engineering and train machine learning models. The disclosed techniques generate more meaningful features, which increases the likelihood that they will be beneficial for the machine models to learn how to solve a problem or perform a task, and improves the interpretability of the final model.

The semantic-aware feature learning techniques disclosed herein find application in a variety of settings. For example, they can be used for automatic machine learning for security including identifying misappropriation of information and preventing the subsequent use of misappropriated information. A computer processor analyzes transaction data (e.g., credit card transactions at points of service) to detect patterns that indicate security breaches and/or fraudulent transactions. Machine learning can be used to detect fraud and mitigate damage caused by such security breaches. For example, a credit card issuer can use transactional data to pick out features and train machine learning models to detect suspicious transactions. Since feature engineering is one of the most time-consuming data science tasks (taking a person on the order of weeks to complete), automating this task enables data scientists to focus their time on other tasks and reduce the amount of time needed to put models into production. Consequently, the system can react promptly to security attacks such as fraud attacks.

Figure 2:
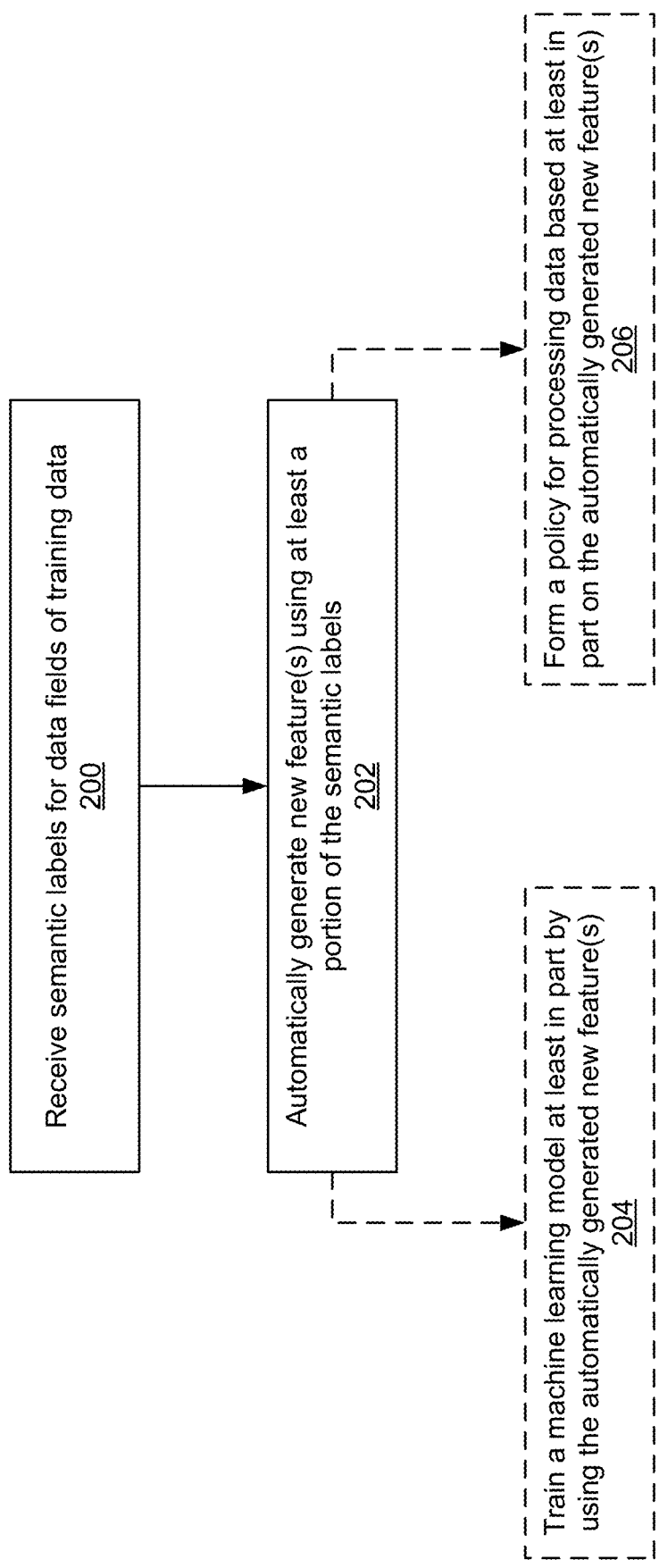
FIG. 2 is a flow chart illustrating an embodiment of a process for semantic-aware feature engineering.
Figure 3:
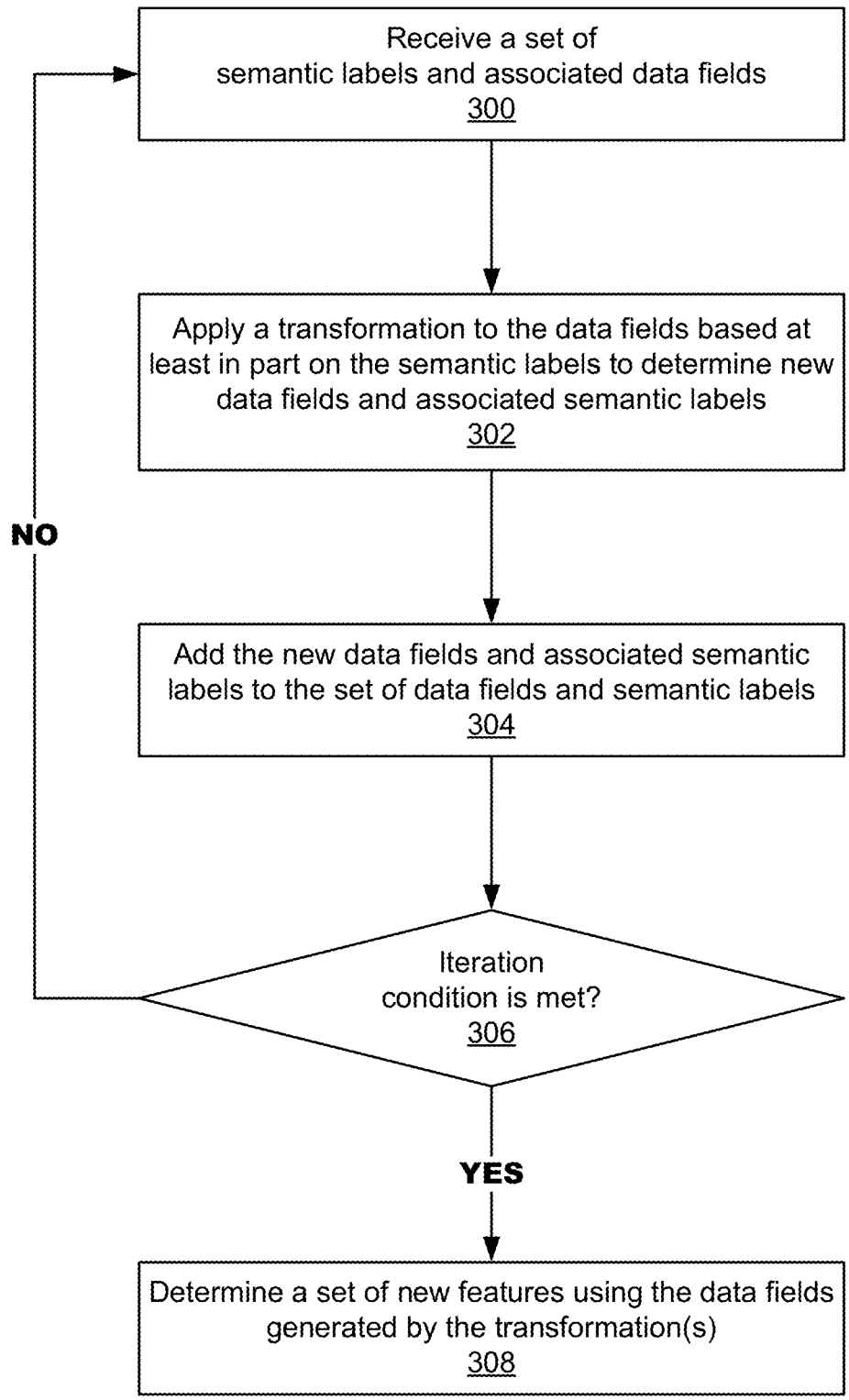
FIG. 3 is a flow chart illustrating an embodiment of a process for generating new features.
Figure 4:
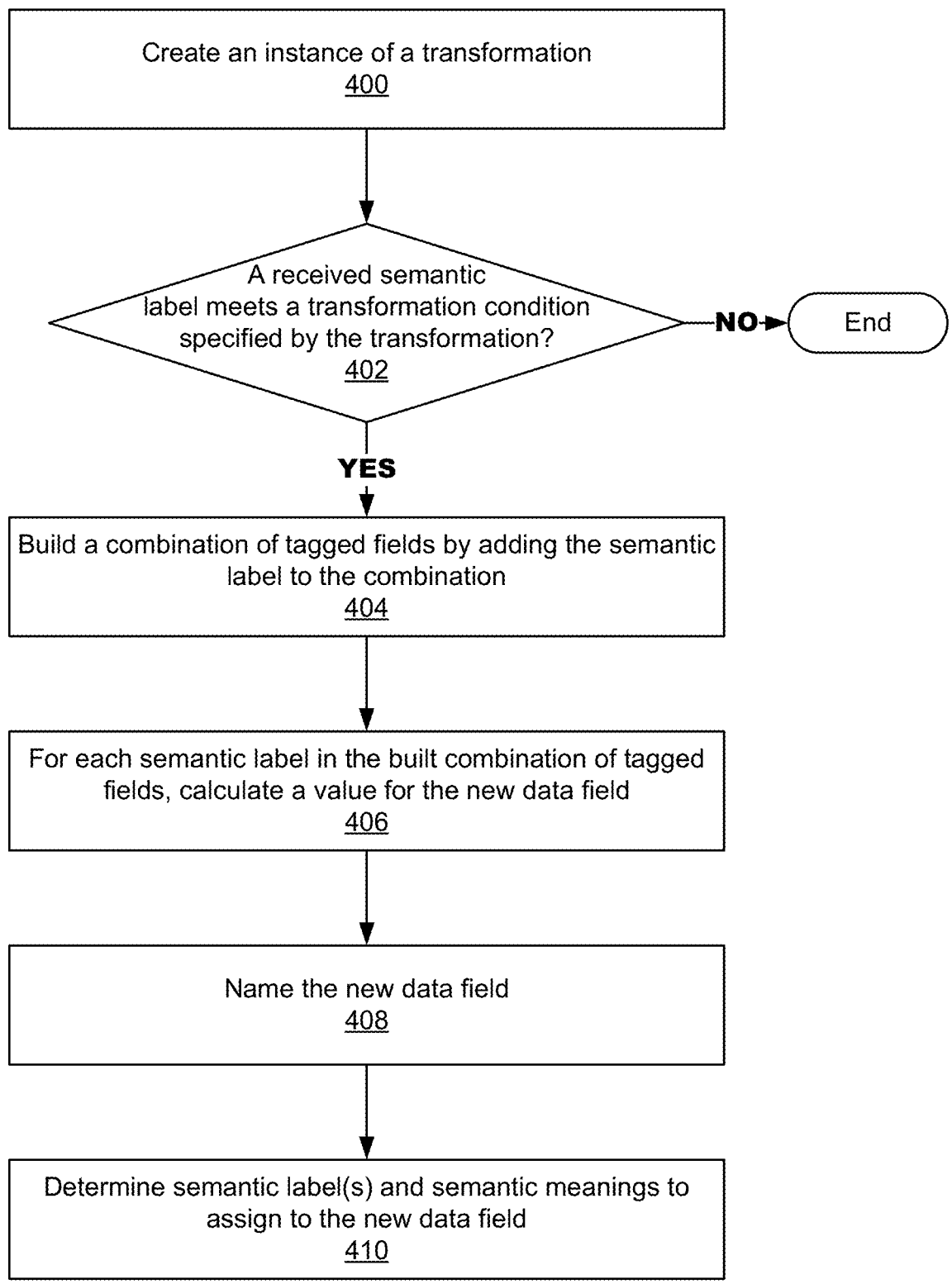
FIG. 4 is a flow chart illustrating an embodiment of a process for applying a transformation to obtain new data fields.

First, an example of a system for fraud detection in which the disclosed techniques can be applied is described (FIG. 1). Next, a process for semantic-aware feature engineering is described (FIGS. 2-4). Finally, the process will be illustrated using an example (FIGS. 5-8).

FIG. 1 is a block diagram illustrating an embodiment of a system in which semantic-aware feature engineering can be implemented. The system includes one or more nodes in a cluster 140 that perform semantic-aware feature engineering and identify potentially fraudulent transactions. The environment includes one or more transaction devices 102, 104, 106, gateway 110, network 120, issuer 130, and a cluster 140 made up of one or more nodes 142.1, 142.2. Transaction devices 102-106 collect transaction data, and transmit the transaction data via gateway 110 to issuer 130. Issuer 130 verifies the transaction data to determine whether to approve the transaction. For example, processing a transaction involving a purchase includes receiving account information (e.g., credit/debit) and transaction details (e.g., purchase amount) at a transaction device and determining whether to approve the transaction. An approved transaction may mean that payment by the account is accepted in exchange for goods or services. A denied transaction may mean that payment by the account is denied. Whether to approve or deny a transaction can be based on an assessment of the probability that the transaction is fraudulent. The determination of probability can be by a machine learning model that has been trained using features generated by the semantic-aware feature engineering techniques disclosed herein.

By way of non-limiting example, transaction data may include one or more of: time of transaction, account/payment information (such as a credit card account number, a debit account number, or a bank account wire number), amount paid, currency, transaction location, merchant name, merchant address, category code, city, state, zip, country, terminal identification, authentication type, and the like. In some embodiments, account data is generated by the transaction device by processing/filtering the account information. For example, an account number can be encrypted/hashed to protect the account number. A transaction device may be implemented by a terminal, a point of sale (POS) device, or any other device that accepts account information. For example, a terminal includes a credit card terminal that processes payment based on a received credit card account number. The transaction device may receive and parse account information using a variety of electronic techniques such as a chip reader, a magnetic stripe reader, bar code scanner, etc. In some embodiments, a transaction device is associated with a location and may be identified by its associated location. For example, a brick and mortar retailer (BM) having three checkout terminals (1-3) each equipped with one of the transaction devices 102-106 may be identified by transaction devices BM1, BM2, and BM3. As another example, a transaction device is a website processing payment for goods and services purchased over the Internet.

A transaction location, which is typically associated with a transaction device, is a location where account information can be received to initiate a transaction. A transaction location may be a physical/geographical location, a location of a terminal, a Web location, and the like. Examples of transaction locations include checkout terminals, stores, a group of stores, or a system-wide (e.g., entire E-commerce merchant) location, and the like.

Misappropriated information (e.g., payment information) may be presented to a transaction device 102-106 for a purchase. If misappropriated information is used, then the transaction is fraudulent. During a transaction approval process or shortly after the transaction takes place, real-time cluster detection can be applied to determine whether a transaction is potentially fraudulent. If applied during the transaction, a potentially fraudulent transaction may be prevented by declining the proffered payment method. If applied shortly after the transaction, the transaction may be reviewed and dis-approved or the payment method may be declined for subsequent transactions. This avoids future exploits of the payment method in later stages of a fraud-trip attack. The feature engineering techniques disclosed herein can be used to generate features to input to a machine learning model to train the model to detect fraudulent transactions.

A transaction identified to be potentially fraudulent transaction can trigger remedial action such as verifying with an issuer bank or with the card holder whether the card was used without authorization. If so, then the potentially fraudulent transaction is confirmed to be actually fraudulent. The determination of potentially fraudulent transactions may be used to block a payment type associated with the potentially fraudulent transaction from being used in the future. An anticipated transaction (e.g., future location or time) can be determined/predicted, and preempted by declining the payment type.

Gateway 110 receives transaction data from one or more transaction devices 102-106, routes the transaction data to network 120, and returns an approval or decline notice based on the approval process of network 120. Gateway 110 may include a payment acquirer or Internet Service Provider. For example, the payment acquirer may be software hosted on a third-party server that handles transmissions between a merchant (represented by transaction devices 102-106) and an issuer 130. In some embodiments, a gateway is associated with an acquiring bank (also referred to as a merchant bank). The acquiring bank is registered with a network 120, wherein the network represents a card association or card scheme (e.g., Visa®, MasterCard®, American Express®, etc.). The acquiring bank contracts with merchants to create and maintain accounts allowing the merchant to accept accounts such as credit and debit cards. In some embodiments, gateway 110 processes and encrypts the transaction data before routing the transaction data. In some embodiments, gateway 110 groups one or more transactions together and sends the batch of transactions to issuer 130 via network 120.

Network 120 is a platform for transmitting data between devices to support payment processing and electronic payments. In some embodiments, network 120 is associated with a credit card association or card scheme (e.g., Visa®, MasterCard®, American Express®, etc.) and supports communications between association members such as an acquiring bank (e.g., gateway 110) and an issuing bank (e.g., issuer 130). In some embodiments, network 120 implements a clearing house to provide clearing and settlement services. Network 120 determines an appropriate destination to route the transaction data. For example, several issuer banks may be members of the network. The network determines the issuer corresponding to the transaction data and routes the transaction to the appropriate issuer. For simplicity, only one issuer 130 is shown in FIG. 1. In some embodiments, network 120 filters the received transaction data. For example, network 120 may be aware of fraudulent accounts and determine whether the received transaction data includes a fraudulent account. Network 120 may include one or more network connected servers for processing, routing, and/or facilitating transactions.

Issuer 130 receives transaction data from network 120 and determines whether to approve or deny a transaction (e.g., a provided account/payment). For example, issuer 130 includes one or more servers/systems of an issuing bank. In some embodiments, the issuer is associated with an acquiring bank via network 120. In some embodiments, determining whether to approve or deny an account/payment method includes determining whether the transaction is potentially fraudulent. For example, a transaction is considered potentially fraudulent if the payment method (e.g., account) is similar to other potentially fraudulent transactions as determined by a similarity measure, which can be determined by a machine learning model which has been trained using input features. The input features can be automatically generated using the process shown in FIGS. 2-4.

In some embodiments, nodes of cluster 140 are controlled and managed by issuer 130. For example, devices/systems of the issuer or payment processing network retain transaction information and perform analysis to identify potentially fraudulent transactions. For example, the one or more nodes may be provided within the computing environment of issuer 130. In some embodiments, nodes of cluster 140 are controlled and managed by a third party. For example, issuer 130 has contracted with the third party to perform analysis using data provided to the issuer (e.g., transaction information) to identify for the issuer likely potentially fraudulent transactions. One or more nodes of cluster 140 perform the processes described herein, e.g., the processes shown in FIGS. 2-4.

Results of potentially fraudulent transaction analysis (output by a machine learning model trained using features generated by the semantic-aware feature engineering techniques disclosed herein) are useful for, among other things, determining whether to allow or deny a transaction. A transaction attempted to be performed by an account identified as likely compromised is denied. As another example, transaction authorization is handled as follows. Previously identified fraudulent transactions are stored in storage 144. When performing transaction authorization based on received transaction information, issuer 130 accesses storage 144 to determine whether the received transaction information is associated with a transaction device/location previously identified as a potentially fraudulent transaction stored in storage 144. For example, if the transaction information is similar to a previously-identified potentially fraudulent transaction, the issuer denies the transaction.

Storage 144 stores information about transactions. Storage 144 can be implemented by or include a variety of storage devices including devices for a memory hierarchy (cache, RAM, ROM, disk). In some embodiments, storage 144 stores a list of potentially fraudulent transactions and/or a list of stolen/fraudulent accounts. The transaction information can be provided as a single transaction or a list of transactions. In some embodiments, a list of (past) transactions is stored in storage 144 for a pre-determined time, and is used to analyze subsequently-received transactions to provide output.

A payment verification process may take place within the environment shown in FIG. 1. In operation, a transaction device (102, 104, and/or 106) receives transaction information such as account, time, amount, etc. as further described herein. In some embodiments, the transaction device processes the transaction information (e.g., packages the data). The transaction device sends the transaction data to gateway 110. Gateway 110 routes the received transaction data to network 120. Network 120 determines an issuer based on the transaction data, and sends the transaction data to the issuer. Issuer 130 determines whether to approve or deny the transaction based on the transaction data and a security process performed by one or more nodes 142.1, 142.2. The cluster processes the transaction data by extracting data fields and determining semantic labels associated with the data fields. A semantic label stores a semantic meaning of the data field as further described below. The cluster uses the data fields and semantic labels to determine new features with which to train a machine learning model. The one or more nodes performs a security process by using the trained machine learning model to analyze the received transaction data and identify potentially fraudulent transactions. The processes shown in FIGS. 2-4 are examples of security processes performed by cluster 140.

Network 120 and gateway 110 relay an approval or decline notice back to the transaction device. If the transaction is approved, payment has been accepted and the transaction is successful. If the transaction is declined, payment has not been accepted and the transaction is declined. Generating features to train a machine learning model to detect fraudulent transactions will now be described in greater detail.

FIG. 2 is a flow chart illustrating an embodiment of a process for semantic-aware feature engineering. The process can be performed by a device such as node 142.1 or 142.2 of cluster 140 (alone or in cooperation) or by a processor such as the one shown in FIG. 9. The process generates a new feature by applying a transformation function to one or more existing features.

Figure 6:
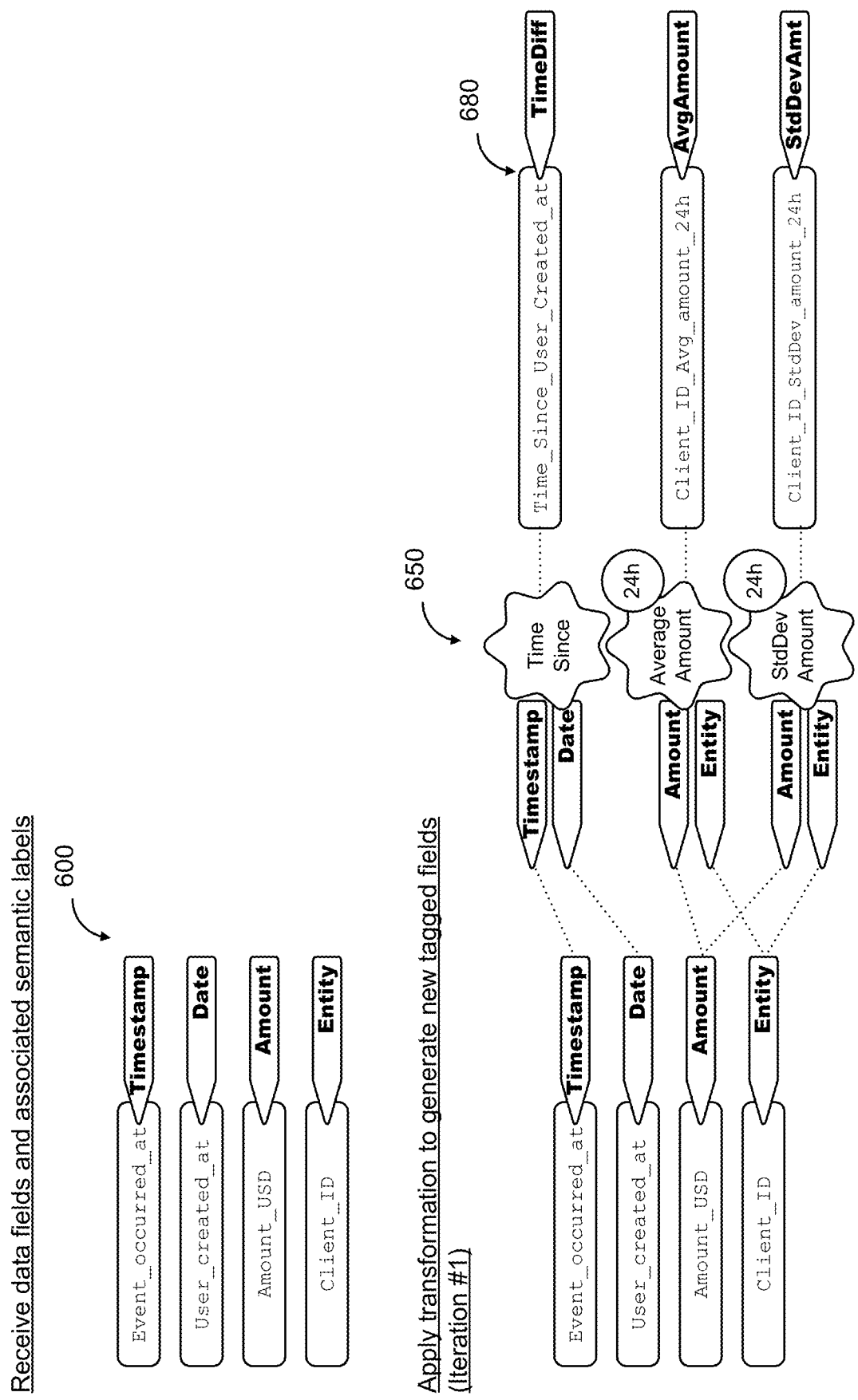
FIG. 6 shows an example of applying a first transformation in semantic-aware feature engineering according to an embodiment of the present disclosure.

The process begins by receiving semantic labels for data fields of training data (200). These data fields can come from a variety of data sources such as machine learning training data. Each of the semantic labels is associated with a semantic meaning associated with a corresponding data field. In other words, a semantic label has a corresponding data field and semantic meaning. An example of a data field is a feature. The semantic label (also called a "tag" or "label") for a data field is an abstraction for the semantic meaning of a field or group of fields. In various embodiments, the process extracts the tags and data fields from received data. For example, the data can be received in the form of a tagged field, which is a field/feature extended with one or more tags. Referring to FIG. 6, "Event_occurred_at" is a data field and "Timestamp" is the tag corresponding to that data field. "User_created_at" is another data field and "Date" is the associated tag, etc.

Returning to FIG. 2, the process automatically generates at least one new feature using at least a portion of the semantic labels (202). The process generates a new feature by applying a transformation on the received tag for a data field using domain-specific knowledge encoded in the tag. A transformation expects to receive tags meeting certain conditions. In other words, there are defined set of tags that a transformation accepts as input. The process applies the transformation to those tags that meet the conditions to determine a new feature including an associated tag representing the semantic meaning. An example of a process for automatically generating a new feature using at least a portion of the tags is shown in FIG. 3.

The process can further process the generated features to gain insight about the training data, which may be specific to the type of data seen as further described below. The generated features can be input to a machine learning model to improve the behavior of the model as further described with respect to 204. The generated features can be used (e.g., by a data scientist) to form policies or rules about how to handle data/traffic as further described with respect to 206.

Optionally, the process trains a machine learning model at least in part by using the automatically generated at least one new feature (204). The automatically generated new machine learning feature(s) can be used to develop a machine learning model by inputting the feature to the machine learning model to improve the model's predictive ability. A good feature set is one that minimizes the prediction error of the model for which the feature set is used. Compared with features generated by conventional techniques, the features generated by the techniques disclosed herein are better because they reduce the prediction error of a model that uses these features.

Optionally, the process forms a policy for processing data based at least in part on the automatically generated at least one new feature (206). For example, a data scientist reviews the features and forms policies or rules about how to handle data/traffic. Say the process generates a new feature indicating the probability that a given amount associated with a particular entity indicates a fraudulent transaction. This probability feature can be used to form a policy that says that if the probability of fraud exceeds 75%, then the transaction is to be declined. Compared with features generated by conventional techniques, the features generated by the techniques disclosed herein are better because they are more meaningful. As further described below, the number of generated features can be limited by an iteration condition to focus resources (e.g., data scientists' time and attention) on a set of noteworthy features.

FIG. 3 is a flow chart illustrating an embodiment of a process for generating new features. The process can be performed as part of another process such as part of 202 of FIG. 2. The process can be performed by a device such as node 142.1 or 142.2 of cluster 140 (alone or in cooperation) or by a processor such as the one shown in FIG. 9.

The process receives a set of semantic labels and associated data fields (300). In a first iteration of this process the set of tags and associated data fields includes at least some of the ones received at 200 of FIG. 2. In subsequent iterations (if any, as further described below), the set can be augmented with new data fields and associated labels generated by earlier iterations of the process.

The received tags can be pre-defined, custom-made, or a combination. For example, the tags can pre-defined by a system (e.g., cluster 140 or nodes within the cluster) or a user can select from a list of tags suggested by the system. As another example, a user can define custom tags based on particular domain knowledge or desired custom transformations, which are further described below. The data field associated with the tag stores the value. For example, a schema contains a data field named "shipping_addr_city" marked with an associated tag "City" to indicate that the meaning of the data field is a city. The tagged field "shipping_addr_city" has values for specific cities where goods are sent such as "Lisbon," or "Los Angeles."

Table 1 lists some examples of tags and their associated meanings. These tags are merely exemplary and not intended to be limiting.

TABLE 1

| Semantic Label (Tag) | Meaning |
| --- | --- |
| Address | A composite tag that combines fields with line1, line2, zip, city, region, and country tags |
| Line1 | The first line of an address |
| Line2 | The second line of an address |
| Zip | Zip code |
| City | Geographic location as defined by a city name |
| Region | Geographic location as defined by a region |
| Country | Geographic location as defined by a country |
| Coordinate | A composite tag that combines fields with longitude and latitude tags |
| Longitude | A geographic coordinate specifying an east-west position, e.g., a double |
| Latitude | A geographic coordinate specifying a north-south position, e.g., a double |
| Location | Can be attributed to either countries or cities. Field with this tag can be compared. For example, if a data source has two fields that the city and location tag, they can be compared to see if they match. |
| Datetime | Tag for a field containing date and time, e.g., in milliseconds Unix timestamp format |
| Name | A person's name such as on a card. Can be compared with name in an email for example. |
| Email | Email address |
| Amount | Amount of a transaction in some currency (e.g., US Dollars) |

TABLE 1-continued

| Semantic Label (Tag) | Meaning |
|---|---|
| Entity | For a field by which data is to be ordered to count distinct values such as card or user. |
| Grouping-entity | For a field by which transformations are to be performed (e.g., to build profiles). Examples include cards, client IDs, or accounts. Can be a subset of the fields tagged with the entity tag. Suppose the grouping-entity tag is set for card_id and client_id, and the entity tag is set for card_id, client_id, user_phone, and user_email. Transformations will be performed by card and also by client. |
| Timestamp | For a field of date and time value based on which the data can be aggregated for metrics. For example a Unix timestamp format. |

The tags are specified in a data schema. The data schema describes how to interpret received data (e.g., transactional data, time series, etc.). For example, if data will be received in a csv format or table, an XML file describes what columns/rows of the csv file mean such as the first cell in the first row is expected to be a data field that corresponds to a specific tag. The data schema can be stored in a variety of formats including but not limited to a JSON file.

The process applies a transformation to the data fields based at least in part on the semantic labels to determine a new data field and one or more associated semantic labels (302). A transformation is a function that receives inputs including a tagged field (data field with associated tag) and creates a new tagged field that can be used as a feature based on the semantics of the received tagged field. The process maps input data fields to a new data field that can be used a feature, as further described with respect to FIG. 4, which shows an example of how to apply a transformation.

One type of transformation is an arithmetic transformation (addition, subtraction, etc.) or aggregation over features. This type of transformation may be useful across multiple domains. Another type of transformation is a domain-specific transformation, which is applied to specific types of data to obtain useful results in that domain. For example, in the domain of fraud detection and prevention, a transformation uses (transforms) a given transaction amount to determine the probability of fraud considering a previous history of a user/card.

Like the example of tags described above, a transformation can be pre-defined, custom, or a combination. For example, the process can suggest transformations from a pre-defined list. As another example, a user can define custom transformations based on particular domain knowledge or to build profiles (groups of transformations) for a specific objective or based on individual fraud detection experience. Table 2 lists some examples of transformations, an expected input tag to the transformation, a tag output by the transformation, and the function performed by the transformation. These transformations are merely exemplary and not intended to be limiting.

TABLE 2

| Transformation | Input Tag | Output Tag | Function |
|---|---|---|---|
| AddressConcatenationMap | Address | Concatenated-address | Concatenates the fields that compose an address |
| AddressNormalizationMap | Concatenated-address | Normalized-address | Normalizes concatenated address fields |
| DayOfMonthMap | Datetime | Day-of-month | Extracts the day of the month from dates |
| DayOfWeekMap | Datetime | Day-of-week | Extracts the day of the week from dates |
| DistanceMap | Coordinate, Coordinate | Distance | Computes the distance between two coordinate pairs |
| EmailNameMap | Email | Email-name, Normalized-name | Extracts the email name from email addresses |
| EmailNormalizationMap | Email | Normalized-email | Normalizes email addresses |
| HourMap | Datetime | Hour | Extracts the hour of the day from dates |
| IsCapsMap | Name | Is-caps | Verifies whether all characters in a name are capital letters |
| LogMap | Amount | Log, Log-amount | Computes the logarithm of an amount field |
| MismatchMap | Location, Location | Mismatch | Verifies whether two location fields match. The value of the resulting field is true if the two locations do not match. |
| MonthMap | Datetime | Month | Extracts the month from dates |
| NameNormalizationMap | Name | Normalized-name | Normalizes names |

TABLE 2-continued

| Transformation | Input Tag | Output Tag | Function |
| --- | --- | --- | --- |
| NTokensMap | Name | N-tokens | Counters the number of tokens (words separated by a space) in a name |
| RatioCountUpperLowerMap | Concatenated-address | Ratio | Returns the ratio between the counts of upper and lower letters from the address |
| RatioMap | Count-by, Count-by | Ratio | Returns the ratio of count fields |
| TimeDiffMap | Datetime, Datetime | Time-diff | Returns the time difference from a pair of datetime fields |
| TwoGramSimilarityMap | Normalized-name, Normalized-name | Two-gram-similarity | Returns the two-gram similarity of two names |

A tag is a string that describes the semantic meaning of an associated field. The tag and associated data field can be stored in variety of formats including for example a JSON file. For example, a data scientist can attribute a tag to an associated field as follows:

```
"@type":"simple",
"tags":["Timestamp"],
"fieldDesc":"event_occurred_at"
```

@type takes a string containing the type of the tag, which can be simple or composite as further described below. Tags takes a vector of string with the tag(s). FieldDesc takes a string with a name of the field. In this example, the tag type is simple (not composite), the name of the tag is "Timestamp," and the associated data field is "event_occurred_at".

The process adds the new data field and associated semantic label(s) to the set of data fields and semantic labels (304). The updated set of data fields and tags can be used as input features to a machine learning model so that adding the updated set of data fields can be thought of as adding features to a set of features.

In various embodiments, additional iterations are performed to obtain new data fields. Then data fields (some of which may be new or original) are selected to be used as new features. Updating the set of tags and associated data fields and using the updated set as input to the process of FIG. 3 allows additional iterations to be performed. This means that a field/feature that was a result of a transformation can be input to another transformation. For example, for fraud detection, the process calculates the ratio between the current transaction amount and an average transaction amount (i.e., the average of the past transactions of the same user) by applying a transformation that calculates the ratio using the output of a transformation that calculates the average amount for a given user.

Thus, the process of FIG. 3 can be repeated until an iteration condition is met. The process determines whether the iteration condition is met (306). An iteration condition is any condition related to a transformation result such as a threshold number of (new) data fields generated by one or more transformations, a number of iterations (cycles) performed, until no new fields are created, etc. If the iteration condition is not met, then the process applies a subsequent transformation using as input a set of data fields including the new ones generated by an earlier transformation by returning to 300.

When the iteration condition is met, the process proceeds to determine a set of new features using the data fields generated by the one or more transformations (308). As described above, a data field generated by a transformation can be used as a feature. Thus, the set of new features can simply be the resulting set of tagged fields generated by the transformations or some combination of the tagged fields in the final set of tagged fields resulting from one or more iterations of the process shown in FIG. 3 and may also include one or more original tagged fields.

Next, applying a transformation (302) will be described in greater detail.

FIG. 4 is a flow chart illustrating an embodiment of a process for applying a transformation to obtain new data fields. The process or a portion of the process (such as 406-410) can be performed as part of another process such as part of 302 of FIG. 3. The process can be performed by a device such as node 142.1 or 142.2 of cluster 140 (alone or in cooperation) or by a processor such as the one shown in FIG. 9.

The process begins by creating an instance of a transformation (400). Creating an instance of a transformation includes setting up a transformation by parsing received information to determine the expected inputs to the transformation and other attributes such as time window lengths and functions to be carried out to implement the transformation. Transformations that are domain-specific expect certain types of inputs as further described below. The transformation scope can be limited by specifying conditions that tags are expected to follow if a particular transformation is to be applied to those labels. Limiting the transformation scope reduces the processing resources needed to generate new features and also generates new features that are meaningful and useful for training machine learning models.

The process determines whether a received semantic label meets a transformation condition specified by the transformation (402). A transformation specifies what labels it accepts as input so that only tagged fields that conform to the transformation's expectation are used for the transformation to generate meaningful new data fields. A set of input tags can specify the semantics that fields follow (e.g., respect or conform to) in order to be candidates for applying the transformation. In other words, the transformation condition defines attributes of a tag to which a transformation can be applied to ensure that the output of the transformation is meaningful. For example, an average amount transformation, which calculates the average amount of transactions made by a particular entity expects an amount (in US dollars) and an entity (a client ID). The average amount transformation does not accept other data fields with other tags such as street addresses. As another example, referring to Table 2, the "AddressConcatenationMap" transformation expects an input tag to be an address tag (including strings for Line 1, Line 2, Zip, City, Region, and Country as shown in Table 1).

If the received tag meets an transformation condition, then the process proceeds to build a combination of tagged fields by adding the semantic label to the combination (404). The combination of tagged fields is a collection of all tagged fields that meet the transformation condition of a transformation. Building a combination of such tagged fields retrieves all of the relevant tagged fields for the transformation. In various embodiments, the process checks each of the tags in the received set to determine whether it meets the transformation condition. Those tags that meet the transformation condition are gathered for applying a transformation as described below, and those that do not meet the transformation condition are not used. If none of the tags in the set meets the transformation condition then the process terminates without applying a transformation.

The process calculates a value for the new data field for each semantic label in the built combination of tagged fields (406). The calculation maps an input data field to a new data field by applying one or more functions to a data field associated with the semantic label to obtain a value for a new data field. The function used to transform the data can be specific to the domain of the tag. A variety of functions such as extracting a day of the week from a date, aggregating data over sliding windows, and the examples in Table 2.

The process names the new data field (408). The name can be selected based on the data fields, tags, and properties of the transformation performed (such as time window). For example, an average amount transformation yields a data field named "Avg_Amount_24h" because the transformation was an average amount determination over a 24 hour period. The process thus determines a naming convention for the data field. For example, a name can be automatically generated by concatenating the tags used to perform the transformation.

The process determines one or more semantic labels and semantic meanings to assign to the new data field (410). The transformation encodes what tags to assign the output features as a function of the input features and their associated semantic meanings. Table 2 above gives some examples of output tags for various transformations. The transformations are functions of the input tagged fields so that the semantics of the new data field can be built dynamically unlike conventional approaches such as deep feature synthesis (DFS) where the output type of transformation is the same regardless of input.

In various embodiments, the process can associate conditions with the new data field such as conditions to be respected by an input tag. For example, when comparing country codes, only compare country codes from different addresses. As another example, a transformation that calculates the average of a field over a time window applied to a numeric field that has the "Amount" tag generates a new field with tags that specifies the average of a numeric field (an amount) along with the length of the time window used to make the calculation, and the input data field used to generate the new data field.

A special type of transformation is an aggregation over a window where the transformation is performed over a specified time window. The transformation calculates values for a feature in one instance based on the values of one or more features of several instances. In streaming scenarios such as fraud detection, aggregations over sliding windows of different lengths provide machine learning models with context about past behavior of various entities such as users or cards. A time window can be on the order of one hour, one day, one week, or any other length of time. A time window can be manually defined.

A time-aware transformation can provide historical context to models. For example, a transformation can have a window that specifies the period over which an aggregation is to be performed. By applying windows (of pre-definable range/length/period) the transformation can construct aggregations in streams over various time-spans in the past as well as generate aggregations such as a profile for each individual entity or profiles for clusters of different entities.

Time window information can be stored in a tag. That is, the semantic label has an associated time window, and a transformation determines the time window associated with an input tag. Storing the window size with a tag allows labels to be distinguished between similar transformations over different time periods.

The following figures show examples of tags and transformations, and will be used to explain the processes described above.

Figure 5:
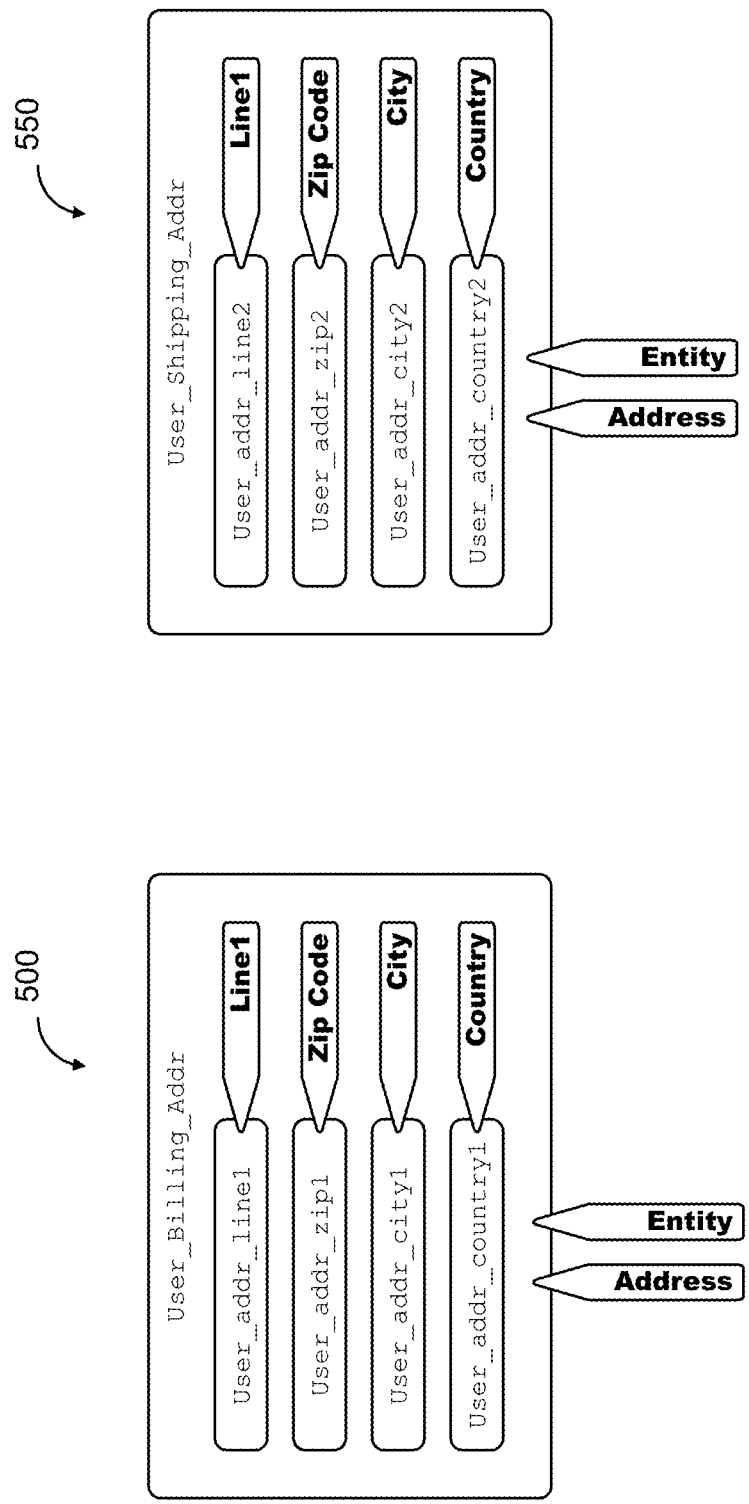
FIG. 5 shows an example of semantic labels used for semantic-aware feature engineering according to an embodiment of the present disclosure.

FIG. 5 shows an example of semantic labels used for semantic-aware feature engineering according to an embodiment of the present disclosure. A semantic label/tag is an annotation that is associated with a data field to convey a semantic meaning of the data field. A tag can be attributed to a field by a user or can be automatically assigned. A data field by itself does not convey a meaning to a feature engineering system, but a tag is understandable by a feature engineering system and can be used to build features using the techniques disclosed herein. For example, the field "user_email_addr" by itself is not meaningful to a feature engineering system, but tagging it "Email," "User Input," or "Entity" conveys meaning to the feature engineering system.

A tagged field is a feature that has an attributed (associated/assigned) tag. Attributing a tag to a feature is not merely an extension of allowed data types because each feature can have several associated tags that can be considered individually or together in order to provide different levels of semantics. In addition, a tag can be assigned to groups of tagged fields.

Referring to group 500 in FIG. 5, field "User_addr_line1" is tagged with tag "Line1," field "User_addr_zip1" is tagged with tag "Zip Code," field "User_addr_city1" is tagged with tag "City," and field "User_addr_country1" is tagged with tag "Country." Thus, "User_addr_line1," "User_addr_zip1," "User_addr_city1," and "User_addr_country1" is each a tagged field because each data field has a respective assigned tag.

A group of tagged fields can also be tagged, and is called a composite field. A composite field is a composition of constituent tagged fields (i.e., data fields with respective semantic labels). A composite field is made up of two or more tagged fields and can itself be associated with other tags. Group 500 "User_Billing_Addr" is a composite field, and group 550 is another composite field "User_Shipping_Addr". A field can be assigned one or more tags. Here, multiple tags "Address" and "Entity" are assigned. As another example, an email address field can be tagged "email," "user input," and "entity" to convey that this field represents an email address that was written as free text by a user. The "entity" tag indicates that this feature represents an entity in a given schema.

In this example, in the data source there is no individual address field and instead there are four fields that describe the address. Typically addresses are stored in a normalized format with each part of the address as individual columns in the dataset. Using the techniques disclosed herein, each column is individually tagged to indicate that they represent the street, the zip code, the city, and the country of the address. "User_Billing_Addr" is a new tagged field and "User Shipping_Addr" is another new tagged field. An "address" tag and an "entity" tag are then assigned to the groups to indicate which fields form the billing address and which form the shipping address. Each of these new tagged fields contain other tagged fields (e.g., "User_addr_line1" and associated tag Line1, etc.). In this way, the hierarchical structure of a feature can be represented.

By specifying a composite field, the system will be able to determine that those four fields are part of the same entity and can apply a transformation or otherwise manipulate the composite field instead of separate constituent tagged fields. For example, the example composite fields shown here can be compared to detect mismatch between billing and shipping addresses.

FIG. 6 shows an example of applying a first transformation in semantic-aware feature engineering according to an embodiment of the present disclosure. The set 600 of tagged fields are examples of data fields and associated tags received in a process such as 200 of FIG. 2 or 300 of FIG. 3. The set of tagged fields 600 includes data fields, "Event_occurred_at," "User_created_at," "Amount_USD," and "Client_ID." Each of these data fields has an associated tag as shown. A tag is a simple descriptor of the semantic meaning of a feature. Here, the tags are "Timestamp," "Date," "Amount," and "Entity." By way of non-limiting example, other tags are "Phone," "Country," "Address," "Merchant," "Card," and "Coordinate," and the examples shown in Table 1 above. The tag conveys a semantic meaning of a feature, so in this example "Event_occurred_at" is tagged with "Timestamp" to indicate that this data field is a timestamp.

New features can be generated (202 of FIG. 2) using the set 600 of tagged fields by applying one or more transformations (302 of FIG. 3). In this example, three transformations will be applied: time since (user was created), average amount, and standard deviation amount. Two of these transformations have associated windows: average amount and standard deviation amount is each calculated for a 24 hour window in this example.

In various embodiments, applying a transformation to the received tags and associated data fields (302 of FIG. 3) includes creating an instance of each transformation (400 of FIG. 4). Referring to FIG. 6, instances 650 of the transformations are shown with one instance for each transformation (time since, average amount, and standard deviation amount).

After creating an instance of each transformation, all combinations of tagged fields are built for each transformation (404 of FIG. 4). One way of thinking of building the combinations of tagged fields is that if a tag meets a transformation condition (402 of FIG. 4), then it belongs to the combination. Otherwise, the tag does not belong, and is not used to build combinations.

Referring to FIG. 6, for the "Time Since" transformation, the expected input fields are "Timestamp" and "Date." In other words, the transformation condition is that the tag will be of a timestamp format or a date format. Other tags such as "Amount" and "Entity" do not meet the transformation condition and thus are not added to the combination for the "Time Since" transformation. The built combination of tagged fields for the "Time Since" transformation includes "Timestamp" and "Date" as indicated by the dashed lines connecting "Timestamp" and "Date" to the "Time Since" transformation in FIG. 6. Similarly, combinations for the "Average Amount" and "StdDev Amount" transformations are built and the tags meeting the transformation condition for each of those transformations are indicated by the dashed lines connecting the tags to the transformations.

After building all combinations of tagged fields for each transformation, each transformation is applied to a respective combination of tagged fields to generate one or more new tagged fields by calculating a value for the new data field (406 of FIG. 4). Referring to FIG. 6, the "Time Since" transformation maps input information (timestamp and date) to a new data field about how new the user is (e.g., how much time has elapsed since the user was created). Thus, the new data field is "Time_Since_User_Created_at" with assigned tag "TimeDiff."

The "Average Amount" transformation maps input information (Amount and Entity) to a new data field about the average value (US dollar amount) of a transaction for a given entity (as identified by a client ID) over a specified time period, here 24 hours. Thus, the new data field is "Client_ID_Avg_amount_24h" with assigned tag "AvgAmount." For example, the transformation sums the value of all of the transactions that a specific client has made in a 24 hour window and divides by the total number of transactions made by that specific client in the 24 hour window to obtain the average spend per transaction. The new data field is specific to the Client ID entity. If there are other fields tagged as entities (e.g., Merchant ID), then another field (Merchant_ID_Avg_amount_24h) is created. This way 24-hour average amounts can be calculated and unambiguously identified for various entities.

The "StdDev Amount" transformation maps input information (Amount and Entity) to a new data field about the variation/dispersion of transactions for a given entity (as identified by a client ID) over a specified time period, here 24 hours. Thus the new data field is "Client_ID_StdDev_amount_24h" with assigned tag "StdDevAmt." For example, the transformation calculates the standard deviation of transactions that a specific client has made in a 24 hour period to obtain the standard deviation amount. The new data field is specific to the Client ID entity. If there are other fields tagged as entities (e.g., Merchant ID), then another field (Merchant_ID_StdDev_amount_24h) is created. This way 24-hour standard deviation amounts can be calculated and unambiguously identified for various entities.

The fields generated by the transformations can have multiple tags (although this example only shows single tags). For example, the Average Amount transformation can create a field with an "Average" tag as well as a "Parents" tag representing the fields used to calculate the field and a "Windows" tag representing the time period used for the transformation. This stores the data lineage so that transformations in subsequent iterations can use this information to create consistent features such as a probability of an amount where the average and standard deviation (two parameters that define the distribution) should calculated over the same time period and aggregated over the same field (e.g., client_ID).

Figure 7:
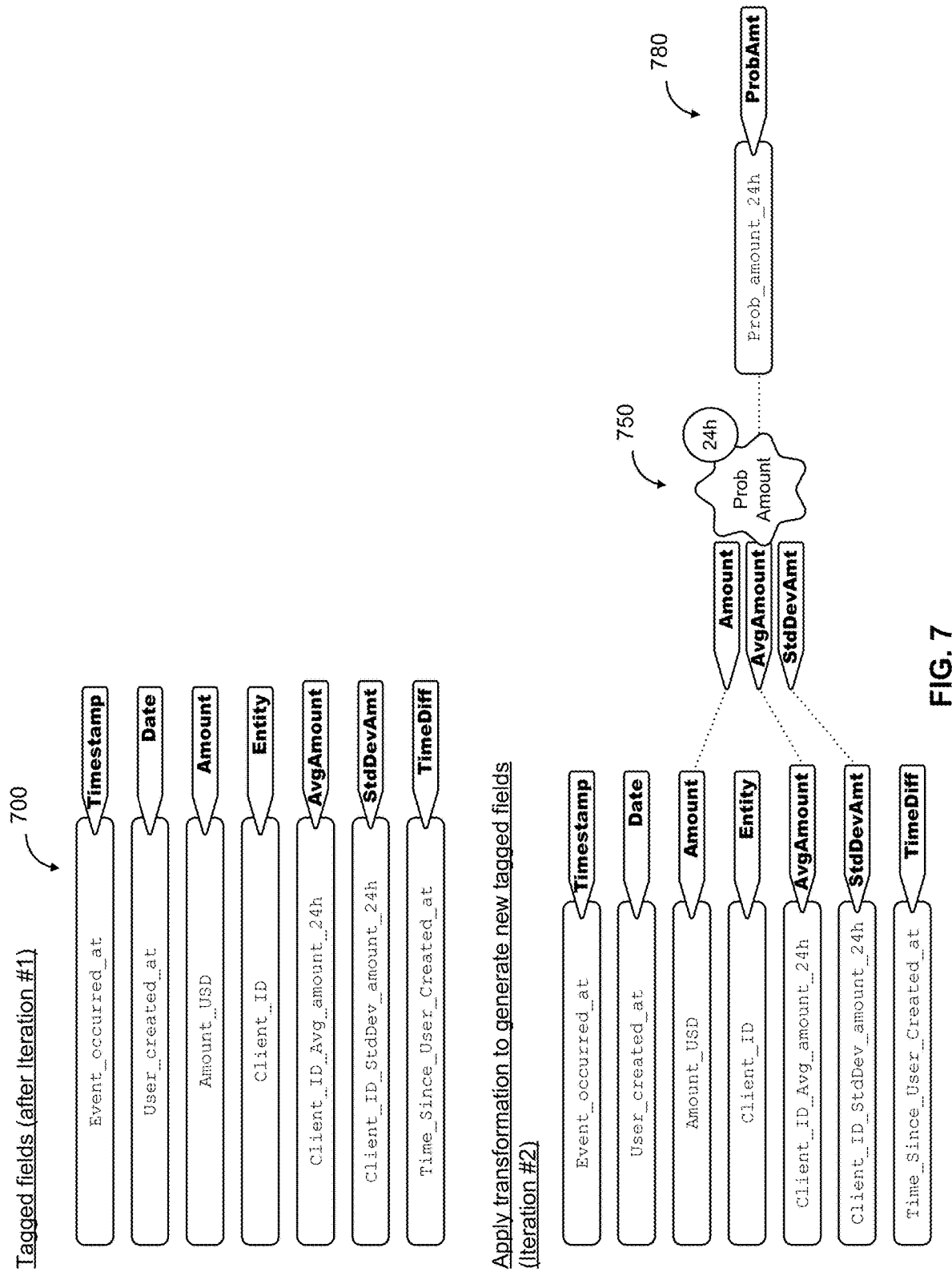
FIG. 7 shows an example of applying a second transformation in semantic-aware feature engineering according to an embodiment of the present disclosure.

Each of the transformations 650 has yielded a tagged field for a total of three new tagged fields as shown in FIG. 7. These tagged fields are added to a set of tagged fields. In various embodiments, duplicates are not added to the set of tagged fields. This concludes a first iteration.

FIG. 7 shows an example of applying a second transformation in semantic-aware feature engineering according to an embodiment of the present disclosure. The result (set of tagged fields) after the first iteration (applying the first transformation discussed in FIG. 6 above) is shown in example set 700 of FIG. 7. The three new tagged fields "AvgAmount," "StdDevAmt," and "TimeDiff" have been added to a set containing the original four tagged fields. This new set of tagged fields can be input to the process to perform additional iterations.

The iteration condition in this example is eight tagged fields, so the process will end when eight new features have been generated. Since the iteration condition in this example is eight fields and the set currently only has seven fields, the process will continue to perform another iteration (300 of FIG. 3). Suppose now the transformation to be applied is the probability of an amount given the history of a user ("Prob Amount").

The process creates an instance of this transformation, and builds all combinations of tagged fields for this transformation. The expected input fields to this transformation ("Prob Amount") are "Amount," "Avg Amount," and "StdDevAmt." Referring to FIG. 7, instance 750 of the transformation is shown along with an associated time window (24 hours). These tagged fields can be found in the input/received tagged fields as indicated by the dashed lines.

After building all combinations of tagged fields for the transformation, the transformation is applied to the combination of tagged fields to generate new tagged field(s). The transformation, "Prob Amount," maps input information (average transaction amount for a given entity and standard deviation of transaction amounts for the given entity) to a new data field about the probability of the current amount being consistent with the history of the user. Thus the new data field (feature) is "Prob amount 24$h$" with assigned tag "ProbAmt." This new tagged field is added to the set of tagged fields.

Note that in this example, the "Prob Amount" transformation cannot be performed until the second iteration when some of the appropriate input tagged fields have been generated ("AvgAmount" and "StdDevAmt"). In various embodiments, the transformation verifies whether the time window used to calculate the standard deviation and average are the same so that only meaningful probability features are added to the data set.

The lengths of the windows and iteration condition in this example is merely exemplary and not intended to be limiting.

Figure 8:
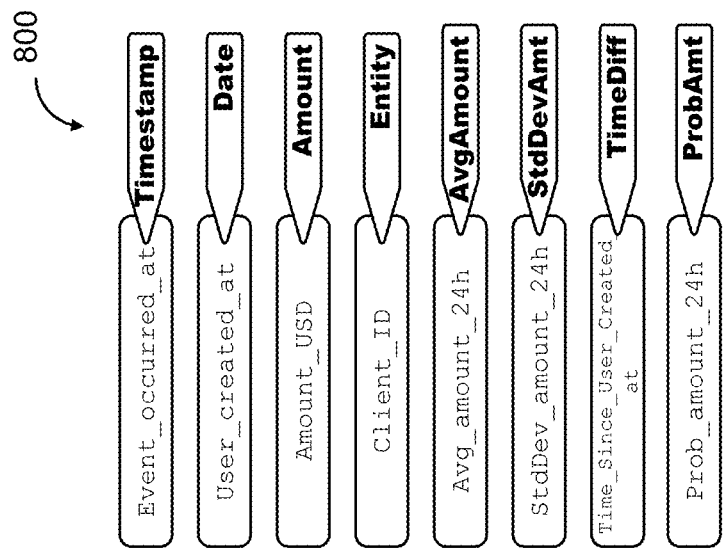
FIG. 8 shows an example of features generated using semantic-aware feature engineering according to an embodiment of the present disclosure.

FIG. 8 shows an example of features generated using semantic-aware feature engineering according to an embodiment of the present disclosure. The result (set of tagged fields) after the first iteration is shown in example set 800. Now the iteration condition is met because there are eight tagged fields in the set so the process ends. Setting a iteration condition can be advantageous because it efficiently uses computing resources without iterating too many times. The iteration condition can be selected to balance a good (accurate) result with using the available computing resources.

Training a machine learning model with the features obtained by the techniques disclosed herein find application in a variety of settings. For example, a machine learning model can identify and prevent fraud such as the example scenarios described with respect to FIG. 1. A profile can be formulated to characterize behavior of at least one entity (such as users and/or cards). The profile includes one or more transformations configured to automatically generate at least one new feature using the techniques disclosed herein. A profile made up of one or transformations enables a characterization of the behavior of entities. A process of calculating a profile includes defining the windows or time periods over which transformations will be calculated. Different window sizes enable characterization of different aspects of behavior. For example, a user can specify various different window sizes. Then, for each transformation in a library of available transformations that performs an aggregation over a window, N new transformations are dynamically created where N is the number of different window sizes. If K is the number of transformations with aggregations, then N×K transformations will be available at runtime.

Figure 10:
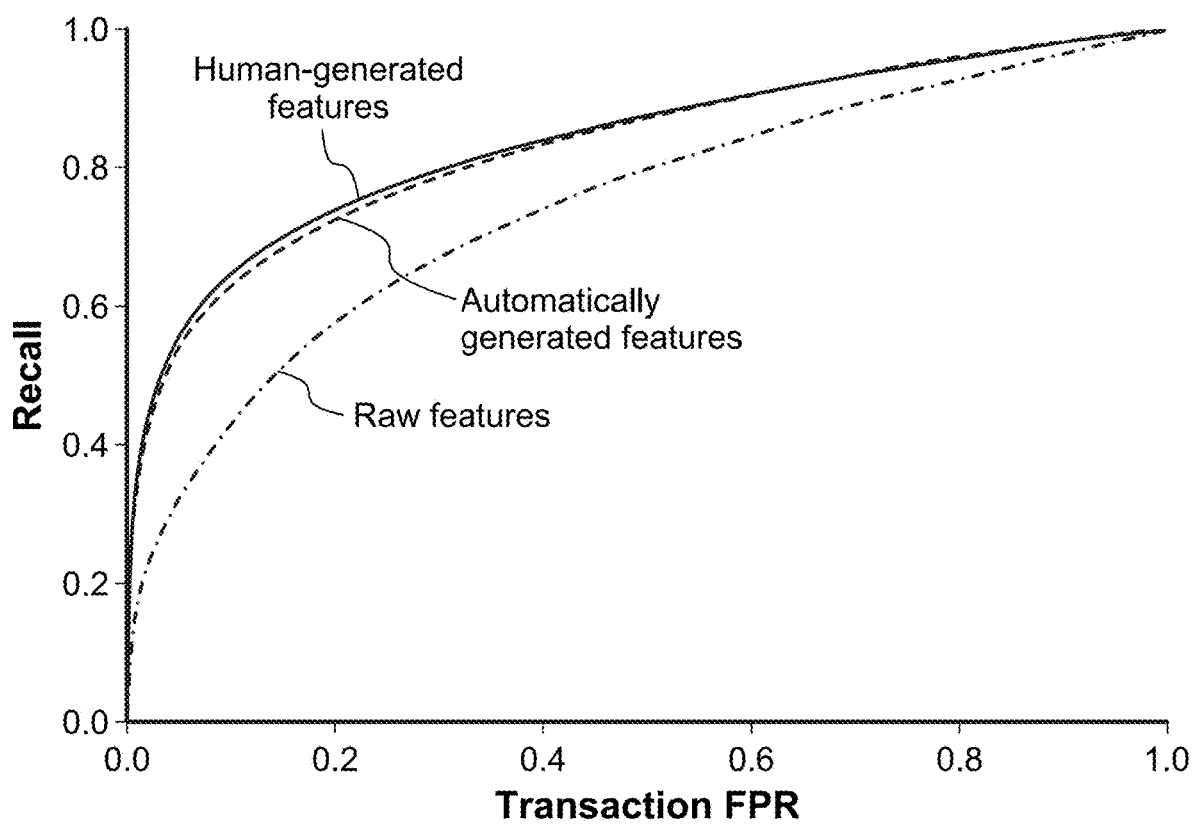
FIG. 10 shows experimental results using semantic-aware feature engineering compared with conventional feature generation.

The semantic-aware feature engineering techniques disclosed herein generate a concise set of meaningful features that can be used to train a machine learning model. The techniques can be applied to improve fraud detection as described above, but is not limited to this type of data. FIG. 10 shows an experimental result demonstrating that the automatically generated features perform similarly to human-generated features.

Figure 9:
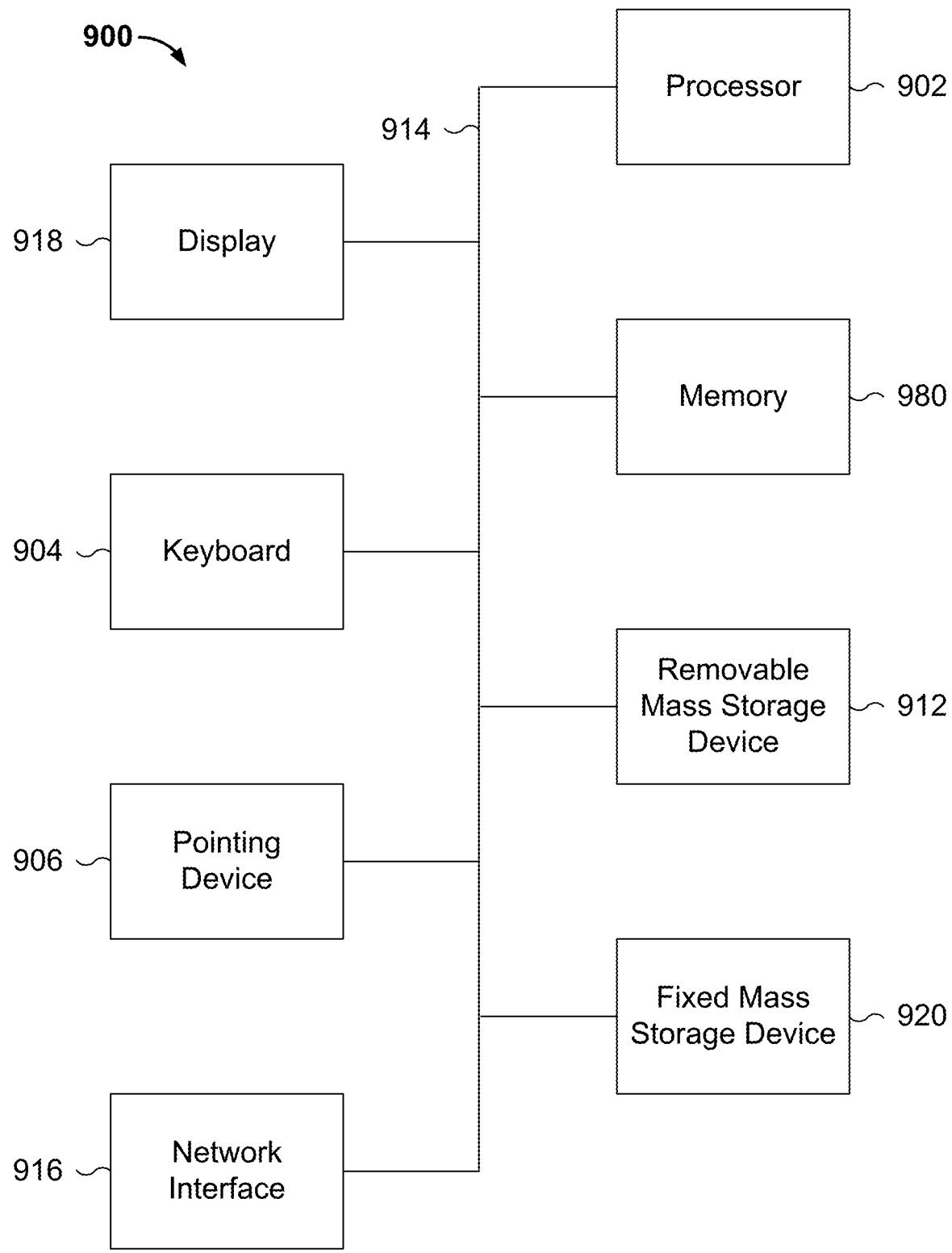
FIG. 9 is a functional diagram illustrating a programmed computer system for semantic-aware feature engineering in accordance with some embodiments.

FIG. 9 is a functional diagram illustrating a programmed computer system for semantic-aware feature engineering in accordance with some embodiments. As will be apparent, other computer system architectures and configurations can be used to perform semantic-aware feature engineering. Computer system 900, which includes various subsystems as described below, includes at least one microprocessor subsystem (also referred to as a processor or a central processing unit (CPU)) 902. For example, processor 902 can be implemented by a single-chip processor or by multiple processors. In some embodiments, processor 902 is a general purpose digital processor that controls the operation of the computer system 900. Using instructions retrieved from memory 980, the processor 902 controls the reception and manipulation of input data, and the output and display of data on output devices (e.g., display 918). In some embodiments, processor 902 includes and/or is used to provide nodes 142.1 or 142.2 or cluster 140 in FIG. 1 and/or executes/performs the processes described above with respect to FIGS. 2-4.

Processor 902 is coupled bi-directionally with memory 980, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 902. Also as is well known in the art, primary storage typically includes basic operating instructions, program code, data, and objects used by the processor 902 to perform its functions (e.g., programmed instructions). For example, memory 980 can include any suitable computer-readable storage media, described below, depending on whether, for example, data access needs to be bi-directional or uni-directional. For example, processor 902 can also directly and very rapidly retrieve and store frequently needed data in a cache memory (not shown).

A removable mass storage device 912 provides additional data storage capacity for the computer system 900, and is coupled either bi-directionally (read/write) or uni-directionally (read only) to processor 902. For example, storage 912 can also include computer-readable media such as magnetic tape, flash memory, PC-CARDS, portable mass storage devices, holographic storage devices, and other storage devices. A fixed mass storage 920 can also, for example, provide additional data storage capacity. The most common example of mass storage 920 is a hard disk drive. Mass storage 912, 920 generally store additional programming instructions, data, and the like that typically are not in active use by the processor 902. It will be appreciated that the information retained within mass storage 912 and 920 can be incorporated, if needed, in standard fashion as part of memory 980 (e.g., RAM) as virtual memory.

In addition to providing processor 902 access to storage subsystems, bus 914 can also be used to provide access to other subsystems and devices. As shown, these can include a display monitor 918, a network interface 916, a keyboard 904, and a pointing device 906, as well as an auxiliary input/output device interface, a sound card, speakers, and other subsystems as needed. For example, the pointing device 906 can be a mouse, stylus, track ball, or tablet, and is useful for interacting with a graphical user interface.

The network interface 916 allows processor 902 to be coupled to another computer, computer network, or telecommunications network using a network connection as shown. For example, through the network interface 916, the processor 902 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 902 can be used to connect the computer system 900 to an external network and transfer data according to standard protocols. For example, various process embodiments disclosed herein can be executed on processor 902, or can be performed across a network such as the Internet, intranet networks, or local area networks, in conjunction with a remote processor that shares a portion of the processing. Additional mass storage devices (not shown) can also be connected to processor 902 through network interface 916.

An auxiliary I/O device interface (not shown) can be used in conjunction with computer system 900. The auxiliary I/O device interface can include general and customized interfaces that allow the processor 902 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 9 is but an example of a computer system suitable for use with the various embodiments disclosed herein. Other computer systems suitable for such use can include additional or fewer subsystems. In addition, bus 914 is illustrative of any interconnection scheme serving to link the subsystems. Other computer architectures having different configurations of subsystems can also be utilized.

FIG. 10 shows experimental results using semantic-aware feature engineering compared with conventional feature generation. This shows the performance using on the order of 20 million records for training and 40 million records for testing. Various windows were used (1 hour, 1 day, 1 week, and 1 month), and 29 transformations were applied (9 of which were aggregations over sliding windows). Four iterations of the process were performed.

The curves show recall (detection rate, which is the percentage of fraudulent transactions blocked) against false positive rate (FPR, which are legitimate transactions blocked). Recall is the proportion of results that were correctly classified. In the case of fraud detection, these are the transactions that were correctly identified as fraudulent. There is typically a trade-off: as more transactions are blocked, more legitimate and more fraudulent transactions are simultaneously blocked. The bottom-left corner corresponds to approving every transaction while the top-right corner corresponds to blocking every transaction.

As shown, human-generated features perform much better than raw features. The features automatically generated by the techniques disclosed herein performs very similarly to human-generated features, but can be programmatically generated much faster (a few hours to one day) than humans can select features (weeks). In addition, models using features generated by the disclosed techniques are always better than raw features for any FPR.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising:
   receiving, by a processor, semantic labels for data fields of training data, wherein each of the semantic labels is associated with a semantic meaning associated with a corresponding data field;
   training, by the processor, a machine learning model including by:
   determining at least one new feature to improve interpretability of the machine learning model as compared to not using the at least one new feature including by:
   determining, by the processor, that a received semantic label of the received semantic labels meets a transformation condition specified by a transformation, wherein the transformation condition defines attributes of a label to which a corresponding transformation is applicable;
   in response to the determination that the received semantic label meets the transformation condition, applying, by the processor, the transformation to the data fields based at least in part on the semantic labels to determine the at least one new feature including by building a combination of tagged fields by adding the received semantic label and associated data field to a group of tagged fields;
   wherein a tagged field includes a data field and an associated semantic label, and the transformation condition reduces computer processing resources by limiting a transformation scope for the at least one new feature as compared to not considering the transformation condition; and using, by the processor, the at least one new feature to train the machine learning model, wherein the trained machine learning model has improved interpretability and consumes reduced computer processing resources as compared to an untrained machine learning model; and determining, by the processor, a profile characterizing behavior of at least one entity, wherein the profile includes at least one transformation configured to automatically generate the at least one new feature.

2. The method of claim 1, further comprising forming a policy for processing data based at least in part on the at least one new feature.

3. The method of claim 1, wherein automatically generating the at least one new feature includes adding the at least one new feature and associated semantic label to a set of features.

4. The method of claim 3, wherein automatically generating the at least one new feature includes applying a subsequent transformation using the set of features in response to a determination that an iteration condition is not met.

5. The method of claim 4, wherein the iteration condition includes at least one of: a threshold number of determined features, threshold number of iterations, and no new data fields created.

6. The method of claim 1, wherein the transformation is domain-specific.

7. The method of claim 1, wherein applying the transformation includes:
calculating a value for the at least one new feature;
naming the at least one new feature; and
determining at least one semantic label and semantic meaning to assign to the at least one new feature.

8. The method of claim 7, wherein calculating the value for the at least one new feature includes applying a function to a received data field associated with a received semantic label.

9. The method of claim 7, wherein the naming of the at least one new feature includes determining a naming convention for the at least one new feature.

10. The method of claim 1, wherein applying the transformation further includes, prior to determining that the received semantic label meets a transformation condition:
creating an instance of the transformation.

11. The method of claim 10, wherein the transformation specifies the transformation condition for input semantic labels such that those data fields with conforming semantic labels are used to determine the at least one new feature.

12. The method of claim 1, wherein the semantic labels are specified in a data schema.

13. The method of claim 1, wherein at least one semantic label of the semantic labels is associated with a composite field, the composite field including a plurality of data fields with respective semantic labels.

14. The method of claim 1, automatically generating the at least one new feature includes applying a transformation over a time window to the data fields based at least in part on the semantic labels to determine the at least one new feature.

15. The method of claim 14, wherein a time window is associated with the received semantic labels.

16. The method of claim 1, further comprising training another machine learning model at least in part by using the automatically generated at least one new feature, wherein the other machine learning model is adapted to identify fraud.

17. A system comprising:
a processor configured to:
receive semantic labels for data fields of training data, wherein each of the semantic labels is associated with a semantic meaning associated with a corresponding data field;
train a machine learning model including by:
determining at least one new feature to improve interpretability of the machine learning model as compared to not using the at least one new feature including by:
determining, by the processor, that a received semantic label of the received semantic labels meets a transformation condition specified by a transformation, wherein the transformation condition defines attributes of a label to which a corresponding transformation is applicable; and
in response to the determination that the received semantic label meets the transformation condition, applying, by the processor, the transformation to the data fields based at least in part on the semantic labels to determine the at least one new feature including by building a combination of tagged fields by adding the received semantic label and associated data field to a group of tagged fields;
wherein a tagged field includes a data field and an associated semantic label, and the transformation condition reduces computer processing resources by limiting a transformation scope for the at least one new feature as compared to not considering the transformation condition; and
use the at least one new feature to train the machine learning model, wherein the trained machine learning model has improved interpretability and consumes reduced computer processing resources as compared to an untrained machine learning model; and
determine a profile characterizing behavior of at least one entity, wherein the profile includes at least one transformation configured to automatically generate the at least one new feature; and
a memory coupled to the processor and configured to provide the processor with instructions.

18. The system of claim 17, wherein the processor is further configured to train another machine learning model at least in part by using the automatically generated at least one new feature, wherein the other machine learning model is adapted to identify fraud.

19. A computer program product embodied in a non-transitory computer readable storage medium and comprising computer instructions for:
receiving semantic labels for data fields of training data, wherein each of the semantic labels is associated with a semantic meaning associated with a corresponding data field;
training a machine learning model including by:
determining at least one new feature to improve interpretability of the machine learning model as compared to not using the at least one new feature including by:
determining that a received semantic label of the received semantic labels meets a transformation condition specified by a transformation, wherein the transformation condition defines attributes of a label to which a corresponding transformation is applicable; and in response to the determination that the received semantic label meets the transformation condition, applying the transformation to the data fields based at least in part on the semantic labels to determine the at least one new feature including by building a combination of tagged fields by adding the received semantic label and associated data field to a group of tagged fields;

wherein a tagged field includes a data field and an associated semantic label, and the transformation condition reduces computer processing resources by limiting a transformation scope for the at least one new feature as compared to not considering the transformation condition; and using the at least one new feature to train the machine learning model, wherein the trained machine learning model has improved interpretability and consumes reduced computer processing resources as compared to an untrained machine learning model; and determining a profile characterizing behavior of at least one entity, wherein the profile includes at least one transformation configured to automatically generate the at least one new feature.

20. The computer program product of claim 19, wherein the computer instructions further include training another machine learning model at least in part by using the automatically generated at least one new feature, wherein the other machine learning model is adapted to identify fraud.

* * * * *